United States Patent
Jiang et al.

(10) Patent No.: US 11,516,684 B2
(45) Date of Patent: Nov. 29, 2022

(54) METHOD AND DEVICE FOR PERFORMING CHANNEL SENSING ON UNLICENSED FREQUENCY BAND

(71) Applicant: VIVO MOBILE COMMUNICATION CO., LTD., Guangdong (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 75 days.

(21) Appl. No.: 16/962,821

(22) PCT Filed: Dec. 27, 2018

(86) PCT No.: PCT/CN2018/124243
§ 371 (c)(1),
(2) Date: Jul. 16, 2020

(87) PCT Pub. No.: WO2019/141058
PCT Pub. Date: Jul. 25, 2019

(65) Prior Publication Data
US 2021/0211908 A1 Jul. 8, 2021

(30) Foreign Application Priority Data
Jan. 17, 2018 (CN) .......................... 201810045887.4

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04W 16/14* (2013.01);
(Continued)

(58) Field of Classification Search
CPC ... H04W 24/08; H04W 16/14; H04W 72/042; H04W 72/0453; H04W 72/046;
(Continued)

(56) References Cited

U.S. PATENT DOCUMENTS

2016/0192395 A1 6/2016 Yoo et al.
2017/0222746 A1 8/2017 Kang et al.
(Continued)

FOREIGN PATENT DOCUMENTS

CN 106664697 * 5/2017
CN 106664697 A 5/2017
(Continued)

OTHER PUBLICATIONS

European Search Report in Application No. 18900967.3 dated Dec. 9, 2020.
(Continued)

*Primary Examiner* — Mewale A Ambaye
(74) *Attorney, Agent, or Firm* — Maschoff Brennan

(57) ABSTRACT

A sensing indication method, a terminal and a network device are provided. A sensing indication method is applied to a terminal and includes: acquiring a target object for channel sensing or uplink transmission; performing a channel sensing on the target object; where the target object includes at least one of: at least one candidate spatial domain transmission filter, at least one candidate uplink Bandwidth Part (BWP) and at least one candidate unlicensed component carrier.

16 Claims, 4 Drawing Sheets

(51) Int. Cl.
*H04W 16/14* (2009.01)
*H04W 72/04* (2009.01)
*H04W 72/10* (2009.01)
*H04W 74/08* (2009.01)

(52) U.S. Cl.
CPC ....... *H04W 72/042* (2013.01); *H04W 72/046* (2013.01); *H04W 72/0453* (2013.01); *H04W 72/10* (2013.01); *H04W 74/0808* (2013.01)

(58) Field of Classification Search
CPC . H04W 72/10; H04W 74/0808; H04W 72/04; H04W 72/12; H04W 16/28; H04W 74/0816; H04L 5/0048; H04L 43/00
See application file for complete search history.

(56) References Cited

U.S. PATENT DOCUMENTS

| | | | |
|---|---|---|---|
| 2017/0273079 A1 | 9/2017 | Park et al. | |
| 2017/0331577 A1* | 11/2017 | Parkvall | H04J 11/0079 |
| 2018/0048498 A1 | 2/2018 | Stern-Berkowitz et al. | |
| 2019/0141546 A1* | 5/2019 | Zhou | H04W 72/1294 |
| 2019/0141742 A1* | 5/2019 | Zhou | H04B 7/02 |
| 2019/0215048 A1* | 7/2019 | Cirik | H04B 7/088 |
| 2020/0146063 A1* | 5/2020 | Xu | H04B 17/318 |
| 2020/0154399 A1 | 5/2020 | Zhu et al. | |
| 2020/0382967 A1* | 12/2020 | Yamada | H04W 16/28 |
| 2021/0022024 A1* | 1/2021 | Yao | H04W 36/0085 |

FOREIGN PATENT DOCUMENTS

| | | |
|---|---|---|
| CN | 107113046 A | 8/2017 |
| CN | 107197524 A | 9/2017 |
| CN | 107431591 A | 12/2017 |
| CN | 109275191 A | 1/2019 |

OTHER PUBLICATIONS

CN Office Action in Application No. 201810045887.4 dated Sep. 27, 2020.
"On UL beam indication" 3GPP TSG-RAN WG1 #90bis, Oct. 9, 2017.
"DRS design for NR unlicensed spectrum" 3GPP TSG RAN WG1 Meeting 91, Nov. 27, 2017.
"High Level Views on BR-U BWP" 3GPP TSG RAN WG1 Meeting 91, Nov. 27, 2017.
"Remaining issues on bandwidth part and wideband operation" 3GPP TSG RAN WG1 NR Ad Hoc Meeting, Jan. 22, 2018.
Written Opinion and International Search Report in Application No. PCT/CN2018/124243 dated Jul. 30, 2020.

* cited by examiner

METHOD AND DEVICE FOR PERFORMING CHANNEL SENSING ON UNLICENSED FREQUENCY BAND

CROSS REFERENCE OF RELATED APPLICATION

The present disclosure is the U.S. national phase of PCT Application PCT/CN2018/124243 filed on Dec. 27, 2018, which claims a priority of Chinese patent application No. 201810045887.4 filed on Jan. 17, 2018, which is incorporated herein by reference in its entirety.

TECHNICAL FIELD

The present disclosure relates to the field of communication technologies, and in particular, to a sensing indication method, a terminal and a network device.

BACKGROUND

In future communication systems, the unlicensed frequency band (unlicensed band) may complement the licensed frequency band (licensed band) to help operators expand service capacity. To be consistent with New Radio (NR) deployments and maximize NR-based unlicensed access as much as possible, the unlicensed bands may operate in the 5 GHz, 37 GHz, and 60 GHz bands. The large bandwidth (80 MHz or 100 MHz) of the unlicensed frequency band can reduce the implementation complexity of a base station and a User Equipment (UE) (also referred to as a terminal). Since the unlicensed frequency bands are shared by multiple Radio Access Technology (RAT), such as WiFi, radar, Long Term Evolution Licensed-Assisted Access (LTE-LAA), and the like, in some countries or regions, the unlicensed frequency bands must be used in accordance with regulation to ensure that all devices can use the resources fairly, such as listen before talk (LBT), maximum channel occupancy time (MCOT), and the like, before transmission.

In Release 15 (Rel-15, R15), the maximum channel bandwidth (channel bandwidth) of the carrier is 400 MHz. However, in view of the terminal capabilities, the maximum bandwidth supported by the terminal may be less than 400 MHz, and the terminal may operate on a plurality of small bandwidth portions (bandwidth part, BWP). Each bandwidth portion corresponds to a Numerology, bandwidth, and frequency location. The base station needs to tell the terminal on which BWP to operate, i.e. which BWP to activate. The activation and deactivation of the BWP may be signaled by DCI. After receiving the activation deactivation command, the terminal receives or transmits on the corresponding activated BWP.

On the unlicensed frequency band, the base station or terminal also needs to perform channel sensing before transmitting on the active BWP, and only when the channel is idle can the information be transmitted.

When the terminal needs to listen on a plurality of beams (beam) or BWP, the terminal needs to be configured or indicated as beam or BWP of LBT, but there is no related solution in the related art.

SUMMARY

In a first aspect, a sensing indication method is provided in an embodiment of the present disclosure, applied to a terminal, including:

acquiring a target object for channel sensing or uplink transmission;

performing a channel sensing on the target object;

where the target object includes at least one of: at least one candidate spatial domain transmission filter, at least one candidate uplink Bandwidth Part (BWP) and at least one candidate unlicensed component carrier.

In a second aspect, a sensing indication method is provided in an embodiment of the present disclosure, applied to a network device, including:

sending a target object for channel sensing or uplink transmission to a terminal;

where the target object includes at least one of: at least one candidate spatial domain transmission filter, at least one candidate uplink Bandwidth Part (BWP) and at least one candidate unlicensed component carrier.

In a third aspect, a terminal is provided in an embodiment of the present disclosure, including:

an acquiring module, configured to acquire a target object for channel sensing or uplink transmission;

a sensing module, configured to perform a channel sensing on the target object;

where the target object includes at least one of: at least one candidate spatial domain transmission filter, at least one candidate uplink Bandwidth Part (BWP) and at least one candidate unlicensed component carrier.

In a fourth aspect, a terminal is provided in an embodiment of the present disclosure, including a memory, a processor and a computer program stored in the memory and executable on the processor, where the computer program is executed by the processor to perform the sensing indication method hereinabove.

In a fifth aspect, a computer readable storage medium storing a computer program is provided in an embodiment of the present disclosure, where the computer program is executed by a processor to perform the sensing indication method hereinabove.

In a sixth aspect, a network device is provided in an embodiment of the present disclosure, including:

a sending module, configured to send a target object for channel sensing or uplink transmission to a terminal;

where the target object includes at least one of: at least one candidate spatial domain transmission filter, at least one candidate uplink Bandwidth Part (BWP) and at least one candidate unlicensed component carrier.

In a seventh aspect, a network device is provided in an embodiment of the present disclosure, including a memory, a processor and a computer program stored in the memory and executable on the processor, where the computer program is executed by the processor to perform the sensing indication method hereinabove.

In an eighth aspect, a computer readable storage medium storing a computer program is provided in an embodiment of the present disclosure, where the computer program is executed by a processor to perform the sensing indication method hereinabove.

BRIEF DESCRIPTION OF THE DRAWINGS

In order that the technical solution in the embodiments of the present disclosure or in the related art may be more clearly described, the accompanying drawings required for the description of the embodiments or the related art will be briefly described. It will be apparent that the accompanying drawings in the following description are merely some of the embodiments described in the present disclosure, and other

DETAILED DESCRIPTION

The technical solution in the embodiments of the present disclosure will be described more clearly and completely below in connection with the accompanying drawings in the embodiments of the present disclosure, and it will be apparent that the described embodiments are a part, but not all, of the embodiments of the present disclosure. Based on the embodiments in the present disclosure, all other embodiments obtained by a person of ordinary skill in the art without involving any inventive effort are within the scope of protection of the present disclosure.

The terms "first" and "second" in the description and claims are to distinguish similar objects rather than describing a specific order. It is to be understood that the data so used may be interchanged, as appropriate, so that the embodiments of the present disclosure described herein, for example, may be implemented in order other than those illustrated or described herein. Furthermore, the terms "comprising" and "having", as well as any variations thereof, are intended to cover a non-exclusive inclusion, for example, a process, method, system, product, or apparatus that includes a series of steps or units is not necessarily limited to those steps or units expressly listed, but may include other steps or units not expressly listed or inherent to such process, method, product, or apparatus. Furthermore, the use of "and/or" in the specification and in the claims means that at least one of the connected objects, such as A and/or B, means that there are three instances in which A alone, B alone, and both A and B are included.

"For example" is used as an example, illustration, or illustration. Any embodiment or design described as "For example" is intended to present the relevant concepts in a specific manner.

Embodiments of the present disclosure are described below with reference to the accompanying drawings. The sensing indication method, terminal, and network device provided in the embodiments of the present disclosure may be applied to a wireless communication system. The wireless communication system may be a system employing 5th Generation (5G) mobile communication technology (hereinafter referred to simply as the 5G system), and it will be appreciated by those skilled in the art that the 5G NR system is exemplary only and is not limiting.

Figure 1:
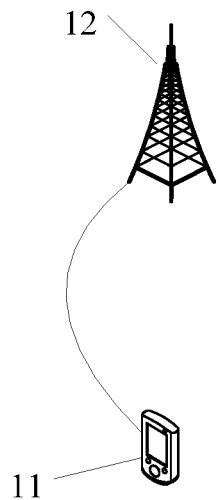
FIG. 1 is a block diagram showing a network system suitable for an embodiment of the present disclosure.

Referring to FIG. 1, FIG. 1 is a structural diagram of a network system applicable to an embodiment of the present disclosure. As shown in FIG. 1, the network system includes a user terminal 11 and a base station 12. The user terminal 11 may be a User Equipment (UE), for example, a terminal-side device such as a mobile phone, a Tablet Personal Computer (Tablet Personal Computer), a Laptop Computer, a personal digital assistant (PDA), a Mobile Internet Device (MID), or a Wearable Device. It should be noted that a specific type of the user terminal 11 is not limited in the embodiment of the present disclosure. The base station 12 may be a base station of 5G and later versions (e.g., gNB, 5G NR NB), or a base station in another communication system, or may be referred to as a Node B. It should be noted that only the base station 5G is used as an example in the present disclosure, but the specific type of the base station 12 is not limited.

In carrying out the description of embodiments of the present disclosure, some concepts used in the following description are first explained.

In future 5 Generation (5G) mobile communication systems, high frequency communication and large-scale antenna technology will be introduced to achieve the goals of downlink transmission rate 20 Gbps, uplink transmission rate 10 Gbps. High frequency communications may provide a wider system bandwidth, and antenna sizes may be smaller, further facilitating large-scale antenna deployment in base stations and terminals. High-frequency communication has the disadvantages of large path loss, easy interference, and weak link, and large-scale antenna technology can provide large antenna gain. Therefore, the combination of high-frequency communication and large-scale antenna is an inevitable trend of future 5G mobile communication systems. In high frequency communications, Transmission and Reception Point (TRP) and terminals will transmit and receive using beamforming techniques.

The transmitting and receiving beam communication (Tx, Rx beam correspondence) of the TRP satisfies at least one of the following conditions:

A11. TRP may determine an uplink reception beam (Rx beam) of one TRP based on measurement of one or more downlink transmission beams (Tx beam) of the TRP by the terminal.

A12. TRP may determine a downstream Tx beam of TRP based on measurements of one or more uplink RX beam of TRP.

TX. Rx beam correspondence of TRP satisfy at least one of the following conditions:

B11. The terminal may determine an uplink Tx beam of a terminal based on measurements of one or more downlink RX beam of the terminal.

B12. The terminal may determine a downlink Rx beam of one UE based on an indication of one or more uplink Tx beam measurements of the terminal by the TRP.

B13. The capability of supporting indicating the terminal beam correspondence related information to the TRP.

Beam may also be referred to as a spatial domain transmission filter, representing different transmission directions in the spatial domain. The base station instructs the spatial domain transmission filter of the terminal for uplink transmission through the "Sounding Reference Signal (SRS) resource indication (resource indicator)" field (field) of the downlink control information (DCI).

In NR Rel-15, the maximum channel bandwidth (channel bandwidth) per carrier is 400 MHz. However, in view of the terminal capabilities, the maximum bandwidth supported by the terminal may be less than 400 MHz, and the terminal may operate on a plurality of small bandwidth portions (bandwidth part, BWP). Each bandwidth portion corresponds to a Numerology, bandwidth, and frequency location. The base station needs to tell the terminal on which BWP to operate, i.e. which BWP to activate. The activation and deactivation of the BWP may be signaled by DCI. After receiving the activation deactivation command, the terminal receives or transmits on the corresponding activated BWP.

On the unlicensed frequency band, the base station or terminal also needs to perform channel sensing before transmitting on the active BWP, and only when the channel is idle can the information be transmitted.

When a terminal needs to listen on a plurality of beam or BWP, it is necessary to configure or instruct the terminal to perform beam or BWP as LBT. The embodiments of the present disclosure are proposed for a problem that network communication reliability cannot be ensured because the related solution does not configure or instruct the terminal to perform beam or BWP as LBT.

Figure 2:
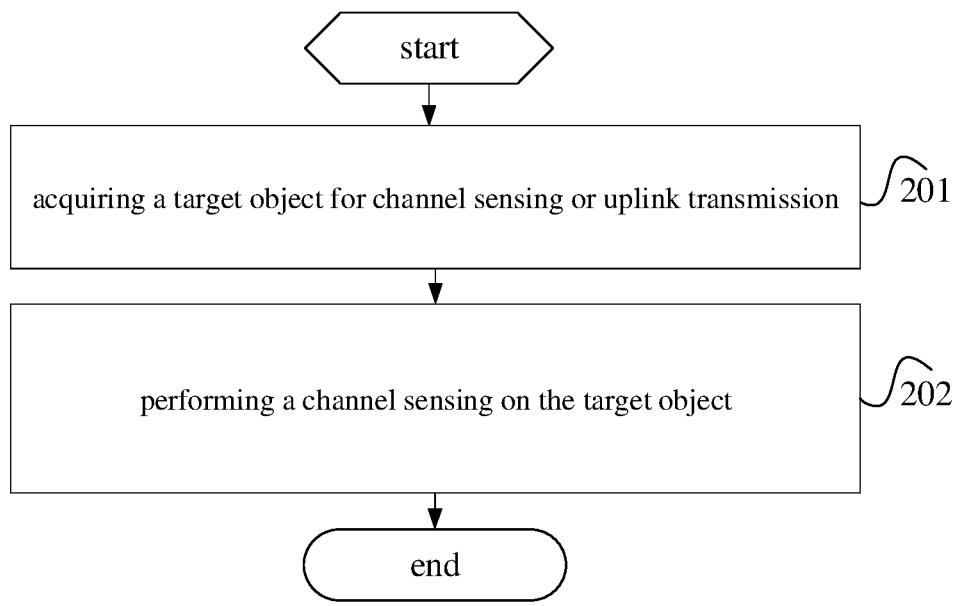
FIG. 2 is a schematic flow diagram of a sensing indication method applied to a terminal side in an embodiment of the present disclosure.

Specifically, as shown in FIG. 2, FIG. 2 is a schematic flow diagram of a sensing indication method applied to a terminal side in an embodiment of the present disclosure. The sensing indication method is applied to a terminal and includes:

Step 201: acquiring a target object for channel sensing or uplink transmission.

It should be noted that the target object includes at least one of at least one candidate spatial domain transmission filter, at least one candidate uplink bandwidth portion (UL BWP), and at least one candidate unlicensed component carrier (CC).

Step 202: performing a channel sensing on the target object;

After obtaining the target object, the terminal may perform channel sensing on the target object. Specifically, the terminal may perform LBT on the target object.

It should be noted that a specific implementation of step 201 is to receive at least one of higher layer signaling and physical layer signaling from a network device. At least one of the higher layer signaling and the physical layer signaling is configured to configure or indicate the target object.

For example, the network device configures the target object only through a higher layer signaling. Alternatively, the network device indicates the target object only by a physical layer signaling. Alternatively, the network device configures the target object through a higher layer signaling and indicates the target object through a physical layer signaling.

It should also be noted that when the network device configures the target object through a higher layer signaling and indicates the target object through a physical layer signaling, the terminal preferentially determines the target object for LBT or uplink transmission according to the indication of the physical layer signaling, that is, the terminal performs LBT on the target object indicated by the physical layer signaling.

Since the specific contents of the target object are different, the configuration or indication modes of the higher layer signaling and the physical layer signaling are also different, the specific case in which the network device uses the higher layer signaling and the physical layer signaling from the perspective of different target objects will be described as follows.

1. When the target object includes at least one candidate uplink BWP

A1. When the network device configures the target object through higher layer signaling, Specifically, the at least one candidate uplink BWP is part or all of the uplink BWP configured for the terminal by the network device.

It should be noted that the network device generally also configures the uplink BWP for the terminal through the higher layer signaling (which is generally radio resource control (RRC) signaling). In the simplest case, if the network device does not configure the candidate uplink BWP for the terminal through the separate higher layer signaling, the terminal performs LBT by using all uplink BWP configured for the network device as the candidate uplink BWP.

A2. When the network device indicates the target object through the physical layer, Specifically, the network device indicates the at least one candidate uplink BWP through a first preset field in downlink control information (DCI);

the first preset field is a newly added field or an extended bandwidth part indicator field in the DCI, and the newly added field or the extended bandwidth part indicator field is configured to indicate identification information of the at least one candidate uplink BWP.

For example, the terminal needs to perform LBT on two uplink BWP. When transmitting DCI, the network device may add a new field (also referred to as field) to the DCI, that is, a new field indicating identification information of the two uplink BWP that needs to perform LBT (for example, an ID or an index (index) of the uplink BWP). The number of bits in this field depends on the number of UL BWP to be LBT.

For example, the network device may also extend the bandwidth part indicator field in the related art in DCI, that is, double the number of bits of the bandwidth part indicator field so that it may indicate the IDs or index of the two uplink BWPs. For example, the bandwidth portion indication field in the related art is 0, 1, or 2 bits. The extended bits are 0, 2, or 4 bits, and it should be noted that the expansion times of the fields in the related art depend on the number of uplink BWP to be sensed.

In this case, it should also be noted that when the terminal is configured or instructed to perform LBT on a plurality of uplink BWPs, except for the ID or index of the uplink BWP, all scheduling information is the same on these uplink BWP, that is, scheduling information on all uplink BWP is consistent, including Modulation and Coding Scheme (MSC), resource allocation (RA), and the like. Only one piece of scheduling information is sent in the DCI. If the number of bits in the bandwidth part indicator field is 0, the uplink BWP information configured by the higher layer signaling RRC is intercepted, and the uplink BWP information is transmitted according to the scheduling information of the DCI on the uplink BWP that is intercepted to be idle. If the DCI includes a bandwidth portion indication field and the field may be used to indicate at least one uplink BWP to be intercepted, the uplink BWP indicated by the terminal interception is transmitted according to the scheduling information of the DCI on the uplink BWP on which the channel is idle.

Further, the network device may configure physical uplink control channel (PUCCH) resources on a plurality of uplink BWP on which the terminal performs LBT and transmits the PUCCH on the uplink BWP on which the channel is detected to be idle. In particular, the network device receives the LBT at the same time on a plurality of uplink BWP configured or indicated for the terminal.

Second, when the target object includes at least one candidate spatial domain transmission filter B1. When the network device configures the target object through higher layer signaling, Specifically, the at least one candidate spatial domain transmission filter is part or all of the spatial domain transmission filters configured by the network device for the terminal.

It should be noted that the network device generally also configures a spatial domain transmission filter for the terminal through higher layer signaling (which is usually RRC signaling). In the simplest case, if the network device does not configure the candidate spatial domain transmission filter for the terminal through the separate higher layer signaling, the terminal performs LBT by using all the spatial domain transmission filters configured for it by the network device as the candidate spatial domain transmission filters.

For example, in this case, the higher layer signaling configured for the target object may be a sounding reference signal resource set (SRS resource set), and the terminal listens to the spatial direction corresponding to the spatial domain transmission filter of the SRS resource in all the SRS resource set, and when it is detected that the channel is idle, the terminal performs uplink transmission in the spatial direction.

B2. When the network device indicates the target object through the physical layer, Specifically, the network device indicates the at least one candidate spatial domain transmission filter through a second preset field in the DCI;

the second preset field satisfies one of:

the second preset field is a newly added indication field of a Sounding Reference Signal (SRS) resource set in the DCI, and the newly added indication field of the SRS resource set indicates at least one SRS resource set;

the second preset field is a newly added indication field of an SRS resource in the DCI, and the newly added indication field of the SRS resource indicates at least one SRS resource;

the second preset field is an extended SRS resource indication field, and the extended SRS resource indication field indicates at least one SRS resource.

It should be noted that both the newly added indication field of the SRS resource and the newly added indication field of the SRS resource set are configured by the network device by using higher layer signaling, and the terminal senses in the spatial direction of the spatial domain transmission filter corresponding to the SRS resource or senses in the spatial direction of the spatial domain transmission filter corresponding to the SRS resource in the SRS resource set by acquiring the newly added indication field of the SRS resource or the newly added indication information of the SRS resource set. The terminal transmits according to the scheduling information of the DCI on the spatial domain transmission filter whose channel is idle.

Further, the network device may configure PUCCH resources on a plurality of spatial domain transmission filters, and the terminal performs LBT on the spatial domain transmission filters and transmits the PUCCH on the spatial domain transmission filters on which the channel is sensed to be idle. Specifically, the network device performs reception in a spatial direction corresponding to a plurality of spatial domain transmission filters configured or indicated for the terminal to perform LBT.

When the target object includes at least one candidate unlicensed component carrier C1. When the network device configures the target object through higher layer signaling, Specifically, the at least one candidate unlicensed component carrier is part or all of the unlicensed component carriers configured for the terminal by the network device.

It should be noted that the network device generally also configures an unlicensed component carrier for the terminal through higher layer signaling (which is usually RRC signaling). In the simplest case, if the network device does not configure the candidate unlicensed component carriers for the terminal through the separate higher layer signaling, the terminal performs LBT by using all the unlicensed component carriers configured for the network device as the candidate unlicensed component carriers.

C2. When the network device indicates the target object through the physical layer Specifically, the network device indicates the at least one candidate unlicensed component carrier through a third preset field in the DCI;

the third preset field is a newly added field or an extended carrier indication field in the DCI, and the newly added field or the extended carrier indication field is configured to indicate identification information of the at least one candidate unlicensed component carrier.

For example, the terminal needs to perform LBT on two unlicensed component carriers, and a new field may be added to the DCI, that is, a new field indicating identification information of the two unlicensed component carriers that need to perform LBT (for example, ID or index of the unlicensed component carrier). The number of bits in this field depends on the number of unlicensed component carriers to be LBT.

For example, the network device may also expand the carrier indictor field in the related art, that is, double the number of bits of the carrier indication field so that it may indicate the ID or index of two unlicensed component carriers. For example, the carrier indication field in the related art is 3 bits. The extension is 6 bits, and it should be noted that the extension of the field in the related art depends on the number of unlicensed component carriers to be intercepted.

In this case, it should also be noted that when the terminal is configured or instructed to perform LBT on a plurality of unlicensed component carriers, except for the ID or index of the unlicensed component carriers, all the scheduling information is the same on the unlicensed component carriers, that is, the scheduling information on all the unlicensed component carriers is consistent, including MSC, RA, and the like. If the DCI includes a carrier indication field and the field may be used to indicate at least one unlicensed component carrier to be intercepted, the unlicensed component carrier indicated by the terminal interception is transmitted according to the scheduling information of the DCI on the unlicensed component carrier whose channel is idle.

Further, the network device may configure PUCCH resources on a plurality of unlicensed component carriers on which the terminal performs LBT, to transmit the PUCCH on an unlicensed component carrier on which the channel is idle. In particular, the network device receives at the same time on a plurality of unlicensed component carriers on which the terminal performs LBT and configured or indicated for the terminal.

It should also be noted that when the target object includes at least two of at least one candidate spatial domain transmission filter, at least one candidate uplink BWP, and at least one candidate unlicensed component carrier, the performing channel sensing on the target object includes:

sensing each low-priority target object on each high-priority target object according to a priority order of the target objects, and sensing on the next high-priority target object after one high-priority target object sensed the low-priority target object;

the priority order of the target objects is, in a descending order, a candidate unlicensed component carrier, a candidate uplink BWP, a candidate spatial domain transmission filter.

For example, when the target object indicated by the network device for the terminal includes a plurality of candidate spatial domain transmission filters and a plurality of candidate uplink BWP, the terminal senses all the candidate spatial domain transmission filters on each candidate uplink BWP, and the sensing of all the candidate spatial domain transmission filters on one candidate uplink BWP is finished, the terminal starts sensing all the candidate spatial domain transmission filters on the next candidate uplink BWP.

For example, when the target object indicated by the network device for the terminal includes a plurality of candidate spatial domain transmission filters, a plurality of candidate uplink BWPs, and a plurality of candidate unlicensed component carriers, the terminal senses, on each candidate unlicensed component carrier, all candidate spatial domain transmission filters on each candidate uplink BWP. When the sensing of all candidate spatial domain transmission filters on all candidate uplink BWP on one candidate unlicensed component carrier is finished, the terminal starts sensing all candidate uplink BWPs on the next candidate unlicensed component carrier.

Further, subsequent to the performing the channel sensing on the target object, the sensing indication method further includes:

performing an uplink transmission on the target object in the case that it is sensed that a channel of the target object is idle;

this means that after the terminal senses a target object whose channel is idle, the terminal starts to perform an uplink transmission on the target object;

determining a target object of which a channel is idle and performing an uplink transmission on the target object, in the case that a sensing on all the target objects is finished;

this means that the terminal performs an uplink transmission on a target object whose channel is idle only after all the target objects are sensed.

It should also be noted that when the target object includes at least two target objects of the same type (for example, the at least two target objects of the same type are two or more candidate uplink BWPs, two or more candidate spatial domain transmission filters, or two or more candidate unlicensed component carriers), the terminal may select one of the following ways to perform channel sensing on the target object:

D1: performing the channel sensing, according to a value order of identification information of the at least two target objects of the same type.

For example, when the target object includes two or more candidate uplink BWPs, according to identification information of the candidate uplink BWPs (the identification information is an ID or an index of the candidate uplink BWPs), LBT is performed on the candidate uplink BWPs in a descending order of the identification information of the candidate uplink BWPs. Alternatively, the terminal may perform a LBT on the candidate uplink BWPs in an ascending order of the identification information of the candidate uplink BWPs.

D2: performing the channel sensing on the at least two target objects of the same type, according to a random order;

Here, the sensing order of the target object is not limited, and the terminal may perform a channel sensing on the target object in any order according to its own random selection rule.

D3. performing the channel sensing on the at least two target objects of the same type, according to an information transmission sequence of the at least two target objects of the same type;

It should be noted that in this manner, the sensing is performed according to an information transmission sequence of the target objects. For example, the terminal compares the time in which the target object performs information transmission with the current time, and starts to perform the channel sensing on the target object of which the information transmission time is closest to the current time. For example, the terminal preferentially performs channel sensing on the target object that performs the information transmission most recently.

It should be noted that in this embodiment of the present disclosure, a target object configured by a network device for channel sensing or uplink transmission is acquired, and a channel sensing is performed on the target object, thereby improving a network communication flow and ensuring a reliability of network communication.

Figure 3:
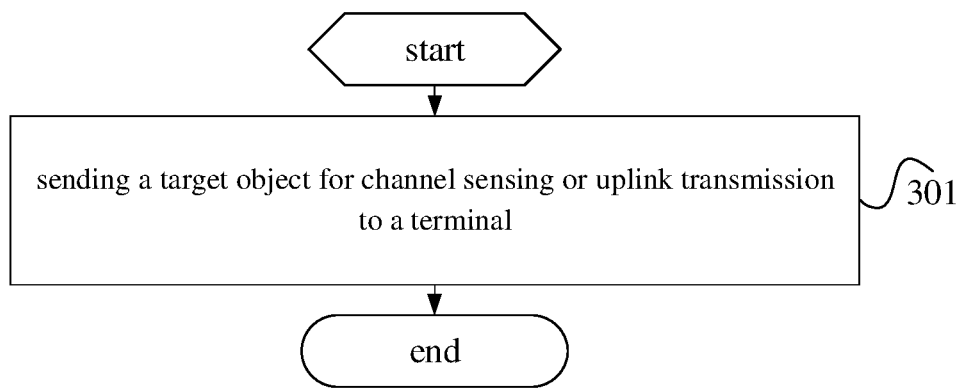
FIG. 3 is a flow diagram of a sensing indication method applied to a network device side in an embodiment of the present disclosure.

As shown in FIG. 3, a sensing indication method is further provided in an embodiment of the present disclosure, applied to a network device, including:

Step 301: sending a target object for channel sensing or uplink transmission to a terminal.

the target object includes at least one of: at least one candidate spatial domain transmission filter, at least one candidate uplink Bandwidth Part (BWP) and at least one candidate unlicensed component carrier.

Further, subsequent to the sending the target object for channel sensing or uplink transmission to the terminal, the method further includes:

transmitting same scheduling information to the terminal on the target object.

It should be noted that all the descriptions on the network device side in the above embodiments are applicable to the embodiments of the sensing indication method on the network device side, and the same technical effects can be achieved.

Figure 4:
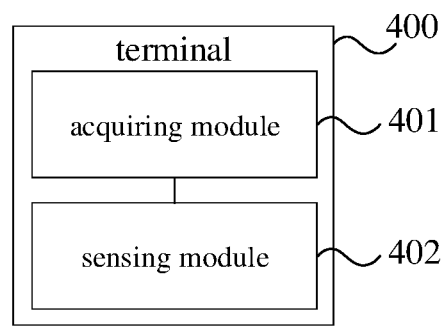
FIG. 4 is a schematic block diagram of a terminal in an embodiment of the present disclosure.

As shown in FIG. 4, a terminal 400 is further provided in an embodiment of the present disclosure, including:

an acquiring module 401, configured to acquire a target object for channel sensing or uplink transmission;

a sensing module 402, configured to perform a channel sensing on the target object;

where the target object includes at least one of: at least one candidate spatial domain transmission filter, at least one candidate uplink Bandwidth Part (BWP) and at least one candidate unlicensed component carrier.

Optionally, the acquiring module is configured to:

receive at least one of a higher layer signaling and a physical layer signaling from a network device;

where at least one of the higher layer signaling and the physical layer signaling is configured to configure or indicate the target object.

Optionally, in the case that the target object is configured by the network device through the higher layer signaling, in the case that the target object includes at least one candidate spatial domain transmission filter, the at least one candidate spatial domain transmission filter is part or all of spatial domain transmission filters configured by the network device for the terminal;

in the case that the target object includes at least one candidate uplink BWP, the at least one candidate uplink BWP is part or all of uplink BWPs configured by the network device for the terminal;

in the case that the target object includes at least one candidate unlicensed component carrier, the at least one candidate unlicensed component carrier is part or all of unlicensed component carriers configured by the network device for the terminal.

Optionally, the target object is indicated by the network device through the physical layer signaling, and in the case that the target object includes at least one candidate uplink BWP, the at least one candidate uplink BWP is indicated by a first preset field in Downlink Control Information (DCI);

where the first preset field is a newly added field or an extended bandwidth part indicator field in the DCI, and the newly added field or the extended bandwidth part indicator field is configured to indicate identification information of the at least one candidate uplink BWP.

Optionally, the target object is indicated by the network device through the physical layer signaling, and in the case that the target object includes at least one candidate spatial domain transmission filter, the at least one candidate spatial domain transmission filter is indicated by a second preset field in DCI;

where the second preset field satisfies one of:

the second preset field is a newly added indication field of a Sounding Reference Signal (SRS) resource set in the DCI, and the newly added indication field of the SRS resource set indicates at least one SRS resource set;

the second preset field is a newly added indication field of an SRS resource in the DCI, and the newly added indication field of the SRS resource indicates at least one SRS resource;

the second preset field is an extended SRS resource indication field, and the extended SRS resource indication field indicates at least one SRS resource.

Optionally, the target object is indicated by the network device through the physical layer signaling, and in the case that the target object includes at least one candidate unlicensed component carrier, the at least one candidate unlicensed component carrier is indicated through a third preset field in DCI;

where the third preset field is a newly added field or an extended carrier indication field in the DCI, and the newly added field or the extended carrier indication field is configured to indicate identification information of the at least one candidate unlicensed component carrier.

Optionally, in the case that the target object is configured by the network device through the higher layer signaling and indicated by the physical layer signaling, the terminal determines the target object for LBT or uplink transmission according to the indication of the physical layer signaling.

Optionally, in the case that the target object includes at least two of at least one candidate spatial domain transmission filter, at least one candidate uplink BWP and at least one candidate unlicensed component carrier, the sensing module is configured to:

sense each low-priority target object on each high-priority target object according to a priority order of the target objects;

where the priority order of the target objects is, in a descending order, a candidate unlicensed component carrier, a candidate uplink BWP, a candidate spatial domain transmission filter.

Optionally, subsequent to performing the channel sensing on the target object, the sensing module is further configured to perform one of:

perform an uplink transmission on the target object in the case that it is sensed that a channel of the target object is idle;

determining a target object of which a channel is idle and perform an uplink transmission on the target object, in the case that a sensing on the target objects is finished.

Optionally, in the case that the target object includes at least two target objects of a same type, the sensing module is configured to:

perform the channel sensing, according to a value order of identification information of the at least two target objects of the same type; or perform the channel sensing on the at least two target objects of the same type, according to a random order; or perform the channel sensing on the at least two target objects of the same type, according to an information transmission sequence of the at least two target objects of the same type.

The terminal 400 provided in the embodiment of the present disclosure is capable of implementing various processes implemented by the terminal 400 in the method embodiment of FIG. 2. To avoid repetition, details are not described herein. The terminal 400 of this embodiment of the present disclosure improves the network communication flow and ensures the reliability of network communication by acquiring a target object configured by a network device for channel sensing or uplink transmission and performing channel sensing on the target object.

Figure 5:
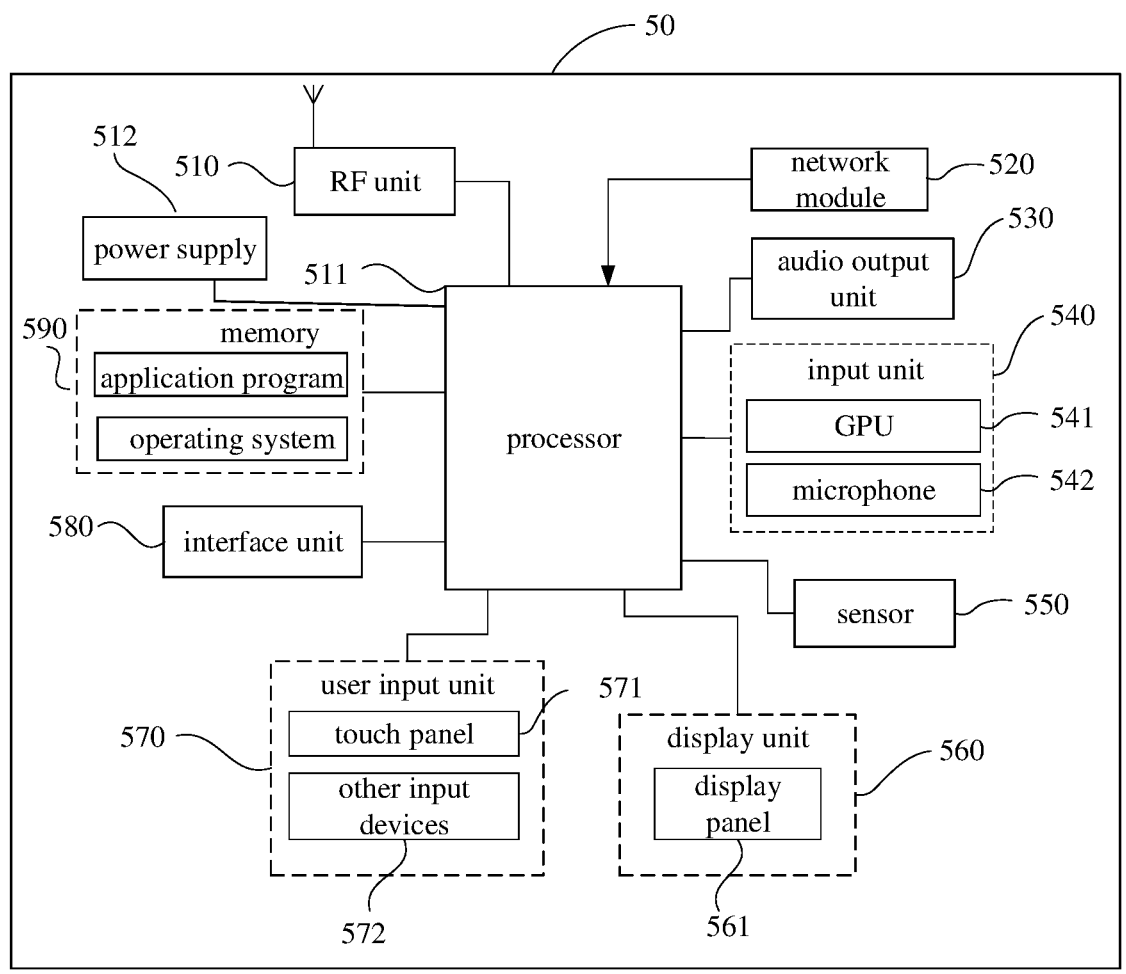
FIG. 5 is a structural block diagram of a terminal in an embodiment of the present disclosure.

FIG. 5 is a schematic diagram of a hardware structure of a terminal for implementing an embodiment of the present disclosure.

The terminal 50 includes, but is not limited to, a radio frequency unit 510, a network module 520, an audio output unit 530, an input unit 540, a sensor 550, a display unit 560, a user input unit 570, an interface unit 580, a memory 590, a processor 511, and a power supply 512. It will be appreciated by those skilled in the art that the terminal structure shown in FIG. 5 does not constitute a limitation on the terminal, which may include more or fewer components than illustrated, or some components may be combined, or different component arrangements. In the disclosed embodiment, the terminal includes, but is not limited to, a mobile phone, a tablet computer, a notebook computer, a palmtop computer, an in-vehicle terminal, a wearable device, a pedometer, and the like.

the processor 511 is configured to acquire a target object for channel sensing or uplink transmission, and perform a channel sensing on the target object;

the target object includes at least one of at least one candidate spatial domain transmission filter, at least one candidate Uplink Bandwidth Part (BWP), and at least one candidate unlicensed component carrier.

According to the terminal in the embodiment of the present disclosure, a target object configured by a network device for channel sensing or uplink transmission is acquired, and a channel sensing is performed on the target object, thereby improving a network communication flow and ensuring a reliability of network communication.

It should be understood that in this embodiment of the present disclosure, the radio frequency unit 510 may be configured to receive and transmit signals during transmission and reception of information or a call, and specifically, receive downlink data from a network device and then process the received downlink data to the processor 511. In addition, uplink data is transmitted to the network device. Generally, the radio frequency unit 510 includes, but is not limited to, an antenna, at least one amplifier, a transceiver, a coupler, a low noise amplifier, a duplexer, and the like. In addition, the radio frequency unit 510 may also communicate with the network and other devices through a wireless communication system.

The terminal provides wireless broadband Internet access to the user through the network module 520, such as assisting the user in receiving and transmitting email, browsing web pages, and accessing streaming media, etc.

The audio output unit 530 may convert the audio data received by the radio frequency unit 510 or the network module 520 or stored in the memory 590 into an audio signal and output as sound. Moreover, the audio output unit 530 may also provide audio output (e.g., call signal reception sound, message reception sound, etc.) related to a specific function performed by the terminal 50. The audio output unit 530 includes a speaker, a buzzer, a receiver, and the like.

The input unit 540 is adapted to receive an audio or video signal. The input unit 540 may include a Graphics Processing Unit (GPU) 541 that processes image data of still pictures or videos obtained by an image capturing device, such as a camera, in a video capturing mode or an image capturing mode, and a microphone 542. The processed image frame may be displayed on the display unit 560. The image frames processed by graphics processor 541 may be stored in memory 590 (or other storage medium) or transmitted via radio frequency unit 510 or network module 520. The microphone 542 may receive sound and can process such sound into audio data. The processed audio data may be converted into a format output that may be transmitted to the mobile communication network device via the radio frequency unit 510 in the case of a telephone talk mode.

The terminal 50 also includes at least one sensor 550, such as a light sensor, a motion sensor, and other sensors. Specifically, the light sensor includes an ambient light sensor that can adjust the brightness of the display panel 561 according to the brightness of the ambient light, and a proximity sensor that can close the display panel 561 and/or backlight when the terminal 50 moves to the ear. As one type of the motion sensor, the accelerometer sensor can detect the magnitude of the acceleration in each direction (generally three axes), can detect the magnitude and direction of the gravity when stationary, and can be used to recognize the terminal attitude (such as horizontal/vertical screen switching, related games, magnetometer attitude calibration), vibration recognition related functions (such as pedometer, knocking), and the like; The sensor 550 may further include a fingerprint sensor, a pressure sensor, an iris sensor, a molecular sensor, a gyroscope, a barometer, a hygrometer, a thermometer, an infrared sensor, and the like. Details are not described herein.

The display unit 560 is configured to display information input by or provided to the user. The display unit 560 may include a display panel 561 that may be configured in the form of a Liquid Crystal Display (LCD), an Organic Light-Emitting Diode (OLED), or the like.

The user input unit 570 may be configured to receive the input number or character information, and to generate key signal input related to the user setting and the function control of the terminal. Specifically, the user input unit 570 includes a touch panel 571 and other input devices 572. Touch panel 571, also referred to as a touch screen, may collect touch operations on or near the user (e.g., operations on or near touch panel 571 using any suitable object or accessory, such as a finger, stylus, or the like). The touch panel 571 may include both a touch detection device and a touch controller. The touch detection means detects a touch orientation of the user, detects a signal brought about by the touch operation, and transmits the signal to the touch controller; The touch controller receives touch information from the touch detection device and converts the touch information into contact coordinates, and sends the contact coordinates to the processor 511 to receive and execute commands sent from the processor 511. In addition, the touch panel 571 may be implemented in various types such as a resistive type, a capacitive type, an infrared ray, and a surface acoustic wave. In addition to the touch panel 571, the user input unit 570 may also include other input devices 572. Specifically, other input devices 572 may include, but are not limited to, a physical keyboard, a function key (such as a volume control key, an on-off key, etc.), a trackball, a mouse, and a joystick. Details are not described herein.

Further, the touch panel 571 may be overlaid on the display panel 561, and when the touch panel 571 detects a touch operation on or near the touch panel 571, the touch panel 571 transmits the touch panel 571 to the processor 511 to determine a type of a touch event, and then the processor 511 provides a corresponding visual output on the display panel 561 according to the type of the touch event. Although in FIG. 5, the touch panel 571 and the display panel 561 are implemented as two separate components to implement the input and output functions of the terminal, in some embodiments, the touch panel 571 and the display panel 561 may be integrated to implement the input and output functions of the terminal, which are not specifically limited herein.

The interface unit 580 is an interface between an external device and the terminal 50. For example, an external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 580 may be used to receive input (e.g., data information, power, etc.) from an external device and transmit the received input to one or more elements within the terminal 50 or may be used to transmit data between the terminal 50 and the external device.

Memory 590 may be used to store software programs and various data. The memory 590 may mainly include a storage program area and a storage data area, wherein the storage program area may store an operating system, an application program (such as a sound play function, an image play function, etc.) required by at least one function, and the like; The storage data area may store data (such as audio data, a phone book, and the like) created according to use of the handset, and the like. In addition, memory 590 may include high speed random access memory, and may also include non-volatile memory, such as at least one magnetic disk storage device, flash memory device, or other volatile solid state storage device.

The processor 511 is a control center of the terminal, connects various parts of the entire terminal by various interfaces and lines, executes various functions of the terminal and processes data by running or executing software programs and/or modules stored in the memory 590 and invoking data stored in the memory 590, thereby monitoring the terminal as a whole. The processor 511 may include one or more processing units. Alternatively, the processor 511 may integrate an application processor and a modem processor, wherein the application processor mainly processes an operating system, a user interface, an application program, and the like, and the modem processor mainly processes wireless communication. It will be appreciated that the modem processor described above may also not be integrated into the processor 511.

The terminal 50 may also include a power supply 512 (such as a battery) for supplying power to the various components. Alternatively, the power supply 512 may be logically connected to the processor 511 through a power management system to perform functions such as managing charging, discharging, and power consumption management through the power management system.

In addition, the terminal 50 includes functional modules not shown, and details are not described herein.

Optionally, a terminal is provided in an embodiment of the present disclosure, including a processor 511, a memory 590, and a computer program stored in the memory 590 and operable on the processor 511, where the computer program is executed by the processor to perform the sensing indication method applied to a terminal side, and achieves the same technical effect. To avoid repetition, details are not described herein.

A computer readable storage medium storing a computer program is provided in an embodiment of the present disclosure, where the computer program is executed by a processor to perform the sensing indication method applied to a terminal side, and can achieve the same technical effect. To avoid repetition, details are not described herein. The computer-readable storage medium includes a Read-Only Memory (ROM), a Random Access Memory (RAM), a magnetic disk, an optical disk, and the like.

Figure 6:
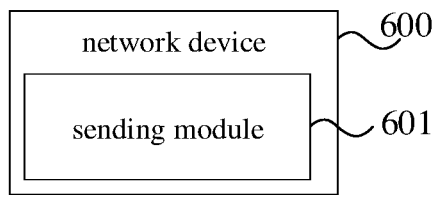
FIG. 6 is a schematic block diagram of a network device in an embodiment of the present disclosure.

As shown in FIG. 6, a network device 600 is provided in an embodiment of the present disclosure, including:

a sending module 610, configured to send a target object for channel sensing or uplink transmission to a terminal;

the target object includes at least one of: at least one candidate spatial domain transmission filter, at least one candidate uplink Bandwidth Part (BWP) and at least one candidate unlicensed component carrier.

Optionally, the network device 600 further includes a transmitting module configured to transmit same scheduling information to the terminal on the target object after the sending module sends the target object for channel sensing or uplink transmission to the terminal.

It should be noted that the network device embodiment is a network device corresponding to the sensing indication method applied to the network device side. All the implementations of the above embodiment are applicable to the network device embodiment, and can achieve the same technical effect.

A network device is further provided in an embodiment of the present disclosure, including a memory, a processor and a computer program stored in the memory and executable on the processor, where the computer program is executed by the processor to perform the sensing indication method applied to a network device side, and the same technical effect can be achieved. To avoid repetition, details are not described herein.

A computer-readable storage medium is further provided in an embodiment of the present disclosure, wherein a computer program is stored in the computer-readable storage medium, where the computer program is executed by the processor to perform the sensing indication method applied to a network device side, and achieves the same technical effect. To avoid repetition, details are not described herein. The computer-readable storage medium includes a Read-Only Memory (ROM), a Random Access Memory (RAM), a magnetic disk, an optical disk, and the like.

Figure 7:
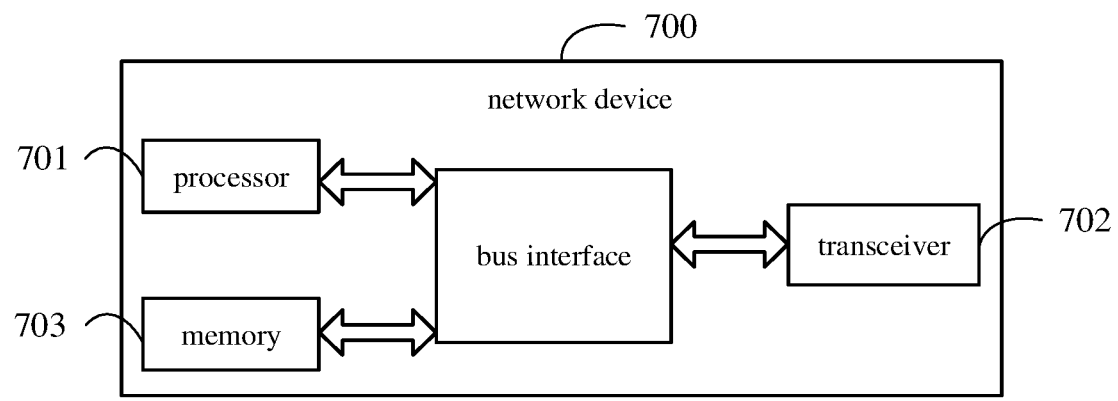
FIG. 7 is a structural block diagram of a network device in an embodiment of the present disclosure.

FIG. 7 is a structural diagram of a network device in an embodiment of the present disclosure, and details of the sensing indication method applied to the network device side can be realized, and the same effect can be achieved. As shown in FIG. 7, a network device 700 includes a processor 701, a transceiver 702, a memory 703, and a bus interface.

The processor 701 reads a program in the memory 703 to:

sending a target object for channel sensing or uplink transmission to the terminal through the transceiver 702;

the target object includes at least one of: at least one candidate spatial domain transmission filter, at least one candidate uplink Bandwidth Part (BWP) and at least one candidate unlicensed component carrier.

In FIG. 7, the bus architecture may include any number of interconnected buses and bridges, specifically one or more processors represented by processor 701 and various circuits of memory represented by memory 703 linked together. The bus architecture may also link various other circuits, such as peripherals, voltage regulators, and power management circuits, all of which are well known in the art and therefore will not be described further herein. The bus interface provides an interface. Transceiver 702 may be a plurality of elements, including a transmitter and a receiver, providing units for communicating with various other devices on a transmission medium.

The processor 701 is responsible for managing the bus architecture and general processing, and the memory 703 may store data used by the processor 701 in performing operations.

Optionally, the processor 701 reads a program in the memory 703 to:

in the case that there are a plurality of the target objects, transmitting the same scheduling information to the target object through the transceiver 702.

The network device may be a Base Transceiver Station (BTS) in Global System of Mobile communication (GSM) or Code Division Multiple Access (CDMA), a NodeB (NB) in Wideband Code Division Multiple Access (WCDMA), an Evolutional Node B (eNB) in LTE, a relay station or an access point, a base station in a future 5G network, or the like, and is not limited herein.

It is to be noted that, in this context, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without more limitations, the elements defined by the "including a" does not rule out there are additional identical elements in a process, method, article, or apparatus that includes the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The foregoing is some embodiment of the present disclosure, it should be noted that several modifications and embellishments may be made by those of ordinary skill in the art without departing from the principles set forth herein, and such modifications and embellishments are also within the scope of the present disclosure.

What is claimed is:

1. A sensing indication method, applied to a terminal, comprising:
    receiving a target object for channel sensing;
    performing a channel sensing on the target object; and
    determining the target object of which a channel is idle and performing an uplink transmission on the target object, in the case that a sensing on the target object is finished;
    wherein the target object comprises at least one of: at least one candidate spatial domain transmission filter, at least one candidate uplink Bandwidth Part (BWP) and at least one candidate unlicensed component carrier;
    wherein in the case that the target object comprises at least two of at least one candidate spatial domain transmission filter, at least one candidate uplink BWP and at least one candidate unlicensed component carrier, the performing the channel sensing on the target object comprises:
    sensing each low-priority target object on each high-priority target object according to a priority order of the target objects;
    wherein the priority order of the target objects is, in a descending order, a candidate unlicensed component carrier, a candidate uplink BWP, a candidate spatial domain transmission filter.

2. The sensing indication method according to claim 1, wherein the receiving the target object for channel sensing comprises:
    receiving at least one of a higher layer signaling and a physical layer signaling from a network device;
    wherein at least one of the higher layer signaling and the physical layer signaling is used to configure or indicate the target object.

3. The sensing indication method according to claim 2, wherein in the case that the target object is configured by the network device through the higher layer signaling,
    in the case that the target object comprises at least one candidate spatial domain transmission filter, the at least one candidate spatial domain transmission filter is part or all of spatial domain transmission filters configured by the network device for the terminal;
    in the case that the target object comprises at least one candidate uplink BWP, the at least one candidate uplink BWP is part or all of uplink BWPs configured by the network device for the terminal;
    in the case that the target object comprises at least one candidate unlicensed component carrier, the at least one candidate unlicensed component carrier is part or all of unlicensed component carriers configured by the network device for the terminal.

4. The sensing indication method according to claim 2, wherein the target object is indicated by the network device through the physical layer signaling, and in the case that the target object comprises at least one candidate uplink BWP, the at least one candidate uplink BWP is indicated by a first preset field in Downlink Control Information (DCI);
    wherein the first preset field is a newly added field or an extended bandwidth part indicator field in the DCI, and the newly added field or the extended bandwidth part indicator field is used to indicate identification information of the at least one candidate uplink BWP.

5. The sensing indication method according to claim 2, wherein the target object is indicated by the network device through the physical layer signaling, and in the case that the target object comprises at least one candidate spatial domain transmission filter, the at least one candidate spatial domain transmission filter is indicated by a second preset field in DCI;
    wherein the second preset field satisfies one of:
    the second preset field is a newly added indication field of a Sounding Reference Signal (SRS) resource set in the DCI, and the newly added indication field of the SRS resource set indicates at least one SRS resource set;
    the second preset field is a newly added indication field of an SRS resource in the DCI, and the newly added indication field of the SRS resource indicates at least one SRS resource;
    the second preset field is an extended SRS resource indication field, and the extended SRS resource indication field indicates at least one SRS resource.

6. The sensing indication method according to claim 2, wherein the target object is indicated by the network device through the physical layer signaling, and in the case that the target object comprises at least one candidate unlicensed component carrier, the at least one candidate unlicensed component carrier is indicated through a third preset field in DCI;
    wherein the third preset field is a newly added field or an extended carrier indication field in the DCI, and the newly added field or the extended carrier indication field is used to indicate identification information of the at least one candidate unlicensed component carrier.

7. The sensing indication method according to claim 2, wherein in the case that the target object is configured by the network device through the higher layer signaling and indicated by the physical layer signaling, the terminal determines the target object for Listen Before Talk (LBT) or uplink transmission according to the indication of the physical layer signaling.

8. The sensing indication method according to claim 1, wherein in the case that the target object comprises at least two target objects of a same type, the performing the channel sensing on the target object comprises one of:
    performing the channel sensing, according to a value order of identification information of the at least two target objects of the same type;
    performing the channel sensing on the at least two target objects of the same type, according to a random order;
    performing the channel sensing on the at least two target objects of the same type, according to an information transmission sequence of the at least two target objects of the same type.

9. A sensing indication method, applied to a network device, comprising:
    sending a target object for channel sensing to a terminal, to enable the terminal to perform a channel sensing on the target object, determine the target object of which a channel is idle and perform an uplink transmission on the target object in the case that a sensing on the target object is finished;
    wherein the target object comprises at least one of: at least one candidate spatial domain transmission filter, at least one candidate uplink Bandwidth Part (BWP) and at least one candidate unlicensed component carrier, and the target object for channel sensing is sent to the terminal to enable the terminal to, in the case that the target object comprises at least two of at least one candidate spatial domain transmission filter, at least one candidate uplink BWP and at least one candidate unlicensed component carrier, sense each low-priority target object on each high-priority target object according to a priority order of the target objects;

wherein the priority order of the target objects is, in a descending order, a candidate unlicensed component carrier, a candidate uplink BWP, a candidate spatial domain transmission filter.

10. The sensing indication method according to claim 9, wherein subsequent to the sending the target object for channel sensing to the terminal, the method further comprises:

transmitting same scheduling information to the terminal on the target object.

11. A terminal, comprising: a memory, a processor and a computer program stored in the memory and executable on the processor, wherein the processor executes the computer program to:

receive a target object for channel sensing;

perform a channel sensing on the target object; and determine the target object of which a channel is idle and perform an uplink transmission on the target object, in the case that a sensing on the target object is finished;

wherein the target object comprises at least one of: at least one candidate spatial domain transmission filter, at least one candidate uplink Bandwidth Part (BWP) and at least one candidate unlicensed component carrier;

wherein in the case that the target object comprises at least two of at least one candidate spatial domain transmission filter, at least one candidate uplink BWP and at least one candidate unlicensed component carrier, the processor executes the computer program to:

sense each low-priority target object on each high-priority target object according to a priority order of the target objects;

wherein the priority order of the target objects is, in a descending order, a candidate unlicensed component carrier, a candidate uplink BWP, a candidate spatial domain transmission filter.

12. The terminal according to claim 11, wherein the processor executes the computer program to:

receive at least one of a higher layer signaling and a physical layer signaling from a network device;

wherein at least one of the higher layer signaling and the physical layer signaling is used to configure or indicate the target object.

13. The terminal according to claim 12, wherein in the case that the target object is configured by the network device through the higher layer signaling, in the case that the target object comprises at least one candidate spatial domain transmission filter, the at least one candidate spatial domain transmission filter is part or all of spatial domain transmission filters configured by the network device for the terminal;

in the case that the target object comprises at least one candidate uplink BWP, the at least one candidate uplink BWP is part or all of uplink BWPs configured by the network device for the terminal;

in the case that the target object comprises at least one candidate unlicensed component carrier, the at least one candidate unlicensed component carrier is part or all of unlicensed component carriers configured by the network device for the terminal.

14. The terminal according to claim 12, wherein the target object is indicated by the network device through the physical layer signaling, and in the case that the target object comprises at least one candidate spatial domain transmission filter, the at least one candidate spatial domain transmission filter is indicated by a second preset field in DCI;

wherein the second preset field satisfies one of:

the second preset field is a newly added indication field of a Sounding Reference Signal (SRS) resource set in the DCI, and the newly added indication field of the SRS resource set indicates at least one SRS resource set;

the second preset field is a newly added indication field of an SRS resource in the DCI, and the newly added indication field of the SRS resource indicates at least one SRS resource;

the second preset field is an extended SRS resource indication field, and the extended SRS resource indication field indicates at least one SRS resource.

15. The terminal according to claim 11, wherein in the case that the target object comprises at least two target objects of a same type, the processor executes the computer program to:

perform the channel sensing, according to a value order of identification information of the at least two target objects of the same type; or perform the channel sensing on the at least two target objects of the same type, according to a random order; or perform the channel sensing on the at least two target objects of the same type, according to an information transmission sequence of the at least two target objects of the same type.

16. A network device, comprising a memory, a processor and a computer program stored in the memory and executable on the processor, wherein the computer program is executed by the processor to perform the sensing indication method according to claim 9.

* * * * *